US006382763B1

(12) United States Patent
Albuquerque et al.

(10) Patent No.: US 6,382,763 B1
(45) Date of Patent: May 7, 2002

(54) INK JET PRINTING

(75) Inventors: Alexandre Albuquerque, Rio de Janeiro; Elcio Bien, Sao Paulo; Marcelo Santos, Rio de Janeiro, all of (BR)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/489,916

(22) Filed: Jan. 24, 2000

(51) Int. Cl.[7] ................................................. B41J 2/015
(52) U.S. Cl. ........................................... 347/21; 347/24
(58) Field of Search .............................. 347/21, 22, 23, 347/25, 28, 35

(56) References Cited

U.S. PATENT DOCUMENTS 3,836,913 A * 9/1974 Burnett et al. ................. 347/25
5,412,411 A * 5/1995 Anderson ...................... 347/28
5,786,829 A   7/1998 Pasciak, Jr. et al. .......... 347/28
6,145,954 A * 11/2000 Moore ........................... 347/28
6,196,657 B1 * 3/2001 Hawkins et al. ............... 347/28

* cited by examiner

*Primary Examiner*—N. Le
*Assistant Examiner*—Shih-wen Hsieh
(74) *Attorney, Agent, or Firm*—Donald T. Black

(57) ABSTRACT

The tendency of gas-propelled ink jet printing systems to clog, and to consume increased amounts of vehicle, is relieved in systems wherein the ink contains one or more components which increase in particle size upon contact with water, by employing gas and vehicle which either contain no water or together contain less water than would be sufficient to cause said increase in particle size.

12 Claims, No Drawings

INK JET PRINTING

FIELD OF THE INVENTION

The present invention relates to apparatus and methods, such as used in ink jet printing, wherein liquid which contains substances suspended therein is forced or drawn by gas pressure through a tube or opening having a very small diameter.

BACKGROUND OF THE INVENTION

In ink jet printing, typically, ink is applied in a pattern to a substrate such as a sheet of paper, a label, the surface of an article, or the like. The ink is forced at high velocity through a nozzle or head, and travels a short distance through the ambient atmosphere outside the nozzle or head to the substrate. The pattern which the ink forms on the substrate is determined by the configuration of minute openings in the head or nozzle through which the ink emerges.

The force impelling the ink is provided by gas under pressure, typically compressed air. The gas is fed from a source, such as a tank or cylinder which maintains the gas under pressure, into one end of a line or tube the other end of which is connected to the nozzle or head.

Existing ink jet printing systems have exhibited several operational drawbacks that operators have up to now had to tolerate. One is that the nozzles periodically become clogged, requiring the system to be shut down so that a clogged nozzle can be cleaned or replaced with an unclogged nozzle. This drawback obviously prevents the system from operating for the time that it is shut down for cleaning and/or replacement of the nozzle. It can also lead a certain proportion of the ink jet-printed product being printed with only mediocre quality, as the nozzle becomes clogged only gradually resulting in gradually reduced sharpness and definition in the pattern that is printed onto the substrate.

This drawback has typically been dealt with by incorporating one or more filters into the lines carrying the vehicle, the concentrate, the gas, and/or the ink/gas mixture. However, this only transfers the site of the clogging from the nozzle to the filter(s), so that it is still necessary periodically to shut down the system to clean and/or replace one or more filter(s).

Another drawback is that the amount of vehicle required for satisfactory printing increases over the course of operation. Ink jet printing systems typically contain means for monitoring the viscosity of the ink, and means for increasing the amount of vehicle fed into the system relative to the amount of concentrate when the viscosity of the ink has increased excessively, thereby attempting to ensure that the viscosity of the ink remains sufficiently low that the ink can flow and can be printed as desired. Conventional ink jet printing systems often draw more and more vehicle, because the ink viscosity gradually increases until a point is reached at which either the filter or nozzle becomes clogged, or the ink is otherwise too viscous to permit satisfactory operation.

Thus, there remains a need in this field for a solution to the problem of clogging of the nozzle and/or filters, and to the problem of excessive vehicle consumption in the course of operation of the system. These problems characterize other devices wherein liquid vehicle contains dispersed therein material which can clog the system, and a solution to these problems would be useful in such contexts as well.

BRIEF SUMMARY OF THE INVENTION

One aspect of the present invention is a method for ink jet printing, comprising (A) feeding gas through a feed line which terminates with an opening;

(B) feeding into said feed line ink concentrate which contains at least one component whose particle size increases upon contact with water;

(C) feeding into said feed line a vehicle which forms ink when combined with said ink concentrate;

(D) combining said ink concentrate and said vehicle in said feed line to form ink; and (E) applying sufficient pressure to said feed line to expel said ink out said opening; wherein said gas and said vehicle contain no water or have a combined water content insufficient to cause said increase in particle size.

Another aspect of the present invention is apparatus for ink jet printing, comprising:

(a) a gas source containing gas;

(b) an ink concentrate source which contains ink concentrate comprising at least one component which increases in particle size when contacted with water;

(c) a vehicle source containing vehicle which forms ink when combined with said concentrate;

(d) a feed line connected to said gas source and ending in an opening, through which feed line said gas can flow from said gas source to said opening;

(e) lines connecting said ink concentrate source and said vehicle source to said feed line; and (f) means for controllably passing gas from said gas source through said feed line, combining said ink concentrate and said vehicle in said line to form ink, and expelling said ink out said opening, wherein said gas and said vehicle contain no water or together have a water content insufficient to cause said increase in particle size.

By virtue of this discovery, it is possible to carry out ink jet printing using this method and this apparatus without incorporating any filters in any of the lines connecting the gas source, the concentrate source, and the vehicle source to the opening.

In preferred embodiments of this invention, the ink concentrate contains nitrocellulose, whose particle size increases upon contact with water as it tends to form gels. Nitrogen, containing no water or only up to 4.0 ppm or 0.0004 wt. % water, is the preferred gas.

DETAILED DESCRIPTION OF THE INVENTION

It will be understood that references herein to "water" include water in any physical state, including water vapor.

It has been discovered that in an ink jet printing system wherein the ink concentrate contains one or more components whose particle size increases upon contact with water (i.e. water vapor or liquid or less often solid water), the aforementioned problems are avoided by forming and spraying the ink with components which contain no water or which contain in the aggregate only a small amount of water, such as up to 60.0 ppm (0.0060 wt. %) water. The aforementioned increase of particle size is irrespective of the particular reason; thus, depending on the component, contact with water might increase particle size through formation of gels, through flocculation or agglomeration, through oligomerization or polymerization, or through the onset of some other chemical reaction leading to increased particle size in the concentrate or the ink.

This discovery is unexpected, particularly in that the prior art has taught overcoming the clogging problems by use of combinations of feed gas and intentionally introduced water.

Suitable gases include nitrogen, argon, and other gases which are inert to the vehicle and to the components of the ink, as well as mixtures of such gases.

Gas such as nitrogen which is either free of water or contains only up to 4.0 ppm or 0.0004 wt. % of water is preferred and is commercially available (e.g. from Praxair, Inc.) in a form which as supplied already has the desired low water content. Alternatively, one can employ gas which as supplied contains more than the indicated maximum water content, provided that before the gas is contacted with the ink concentrate it is treated to remove all the water or to remove at least enough water that the resulting gas together with the vehicle contains no more than 0.0060 wt. % water. Suitable treatment procedures include physical and chemical adsorbents, and cold traps.

It will be recognized here that the ink concentrate should also contain little or no water, such that the aggregate water content of gas, vehicle and concentrate does not exceed about 0.0060 wt. %, but in practice the concentrate will have already attained that low water content by virtue of interaction having already taken place with the component(s) of the concentrate that increase in particle size upon contact with water.

The ink is comprised in part of functional components such as resin (which cures or dries on the substrate to form the final relatively permanent pattern), colorant, thickener, suspending agent, plasticizer, and the like. The identity and choice of suitable components and amounts thereof are well known and conventional in this field. The ink typically contains a curable resin, preferably nitrocellulose (which is an example of an ink component that increases in particle size when contacted with water).

The ink is further comprised of a liquid vehicle, in which the other ink components are dissolved or suspended. The vehicle, too, should either contain no water or preferably contain only up to 55.0 ppm or 0.0055 wt. % water (it being recognized that since the combined water content of the gas and the vehicle must be insufficient to cause an increase in the particle size within the ink, the combined water content of the gas and the vehicle should be less than about 60.0 ppm or 0.0060 wt. %).

The vehicle should be a liquid, comprised of one or more than one component. The vehicle should not react with any of the components of the ink; each of the components of the ink should either dissolve in or be suspended in the vehicle. The vehicle should be sufficiently volatile that at atmospheric pressure it evaporates in a few seconds or less, so that when ink is sprayed onto a substrate the vehicle leaves rapidly and the ink pattern remains. Suitable vehicles include any conventionally used in ink jet printing systems, typically comprising a mixture of volatile organic solvents.

In a typical ink jet apparatus, a gas source such as a tank or cylinder provides the gas under pressure into a line which ends in an opening. The line can be used as such but usually the opening is connected to a printing nozzle or head such as one having an array of two or more openings which define a pattern (which may optionally be controllably varied by the operator) formed by the ink sprayed therethrough onto the substrate. Typical pressures are on the order of 1 to 20 bar.

A concentrate comprised of the components of the ink other than the vehicle (but usually containing a small amount of liquid vehicle, to aid flowability of the concentrate), and the vehicle, are provided in separate containers each of which is connected by a line to the feed line which feeds the aforementioned gas to the ink jet nozzle or head. Preferably, the feed line carrying the gas divides into two branches upstream from the sources of ink concentrate and vehicle, the ink concentrate and the vehicle flow separately each into its own branch of the line, and the two branches then recombine downstream from the sources of concentrate and vehicle into one feed line which leads to the opening, nozzle or head. alternatively, the ink concentrate and the vehicle flow through respective lines which join into one ink line which then feeds into the feed line carrying the gas.

Preferably, a chamber such as a mixing tank is provided and the two aforementioned feed line branches carry the ink concentrate and the vehicle respectively into this chamber. The concentrate and vehicle can become more thoroughly mixed in a mixing tank, especially if it contains a stirrer. Then, a single feed line carries thus-formed ink from the chamber to the opening at the end of the feed line. The chamber can be equipped with a viscosity sensor and associated controls responsive to the sensed viscosity so as to adjust the viscosity of the ink with additional vehicle, as needed to provide proper viscosity of the ink flowing to the end of the feed line.

Pressure needed to drive the gas through the feed line and to expel the ink out the open end of the feed line can be provided entirely from the source of the gas, whereupon the flow of the gas under pressure through the feed line draws the ink concentrate and vehicle into the feed line and into the mixing tank if one is present. Alternatively, pressure can be applied to the ink concentrate source, the vehicle source, and/or the mixing tank.

Valving and controls (manual or automatic) are provided so that the gas flows when desired, controllably and preferably intermittently, into the system at a rate and pressure sufficient to draw the ink concentrate and vehicle into the feed line and to expel the thus formed ink through the printing nozzle toward a substrate. However, if the concentrate and/or vehicle are fed into the feed line by separate pressure sources, appropriate valving and controls can be provided at those sites as well.

The ink concentrate and vehicle are thus combined "in line", by which is meant in the feed line or in any mixing tank or other chamber present in fluid communication with the feed line between the gas source and the opening at the end of the feed line. The ink concentrate is typically diluted by the vehicle by a factor of about 3:1 to about 6:1 (vehicle:concentrate, vol:vol).

The present invention provides numerous advantages. One is that clogging of the nozzle or other points within the system is reduced or eliminated. Indeed, the clogging is avoided to the point that filters can be eliminated from the various lines described herein.

Another advantage is that consumption of vehicle is reduced. Without being bound to a particular theory, this observation is believed to be due to the fact that since water-mediated increases in the particle size of components of the ink no longer occur, it is no longer necessary to add additional amounts of vehicle to compensate for the ongoing increases of viscosity that would otherwise have been suffered. Therefore, the number of ink jet printing operations (such as the number of objects printed) per unit volume of vehicle increases substantially.

EXAMPLES

A nitrogen tank and gas line were installed without filters in an otherwise conventional ink jet printer, which had previously been operated with compressed air. The nitrogen was connected to the same place where the compressed had been connected. Nitrogen was fed at adequate pressure, about 6 bar gauge. The ink was found to contain nitrocellulose as a resin component. The compressed air had a water content of about 1.30 wt. % and the nitrogen had a water content of 0.0004 wt. % or 4.0 ppm.

The ink jet printer embodying the present invention was tested at two different sites. No clogging occurred during either test. Unexpected and substantial vehicle savings were achieved.

The test results are shown in the following tables where the columns from left to right indicate the site, the carrier gas used, the total number of packages printed, the total vehicle consumption in milliliters, and the number of packages printed per milliliter of vehicle.

Test 1 at Site A

The same printer was used for a comparative performance test between the compressed air and the nitrogen at a food plant (site A), printing candy bar packages. In this site, the room temperature was controlled by air conditioning at about 22° C.

Table 1 below shows the test results.

TABLE 1

TEST 1 AT SITE A

| SITE | GAS | TOTAL PACKAGES PROCESSED | TOTAL ML OF VEHICLE | PACKAGES/ML OF VEHICLE |
|---|---|---|---|---|
| A | Compressed Air | 5,223,715 | 1,960 | 2,665 |
| A | Nitrogen | 8,731,499 | 2,750 | 3,175 |

Comparing the results in Test 1, the number of packages printed per milliliter of vehicle increased by about 19% when the nitrogen was used as carrier gas instead of the compressed air.

Test 2 at Site B

In this test at site B, a beverage plant, the room temperature was not controlled and the same printer was used for a comparative performance test between the compressed air and the nitrogen.

Table 2 below shows the test results.

TABLE 2

TEST 2 AT SITE A

| SITE | GAS | TOTAL PACKAGES PROCESSED | TOTAL ML OF VEHICLE | PACKAGES/ML OF VEHICLE |
|---|---|---|---|---|
| A | Compressed Air | 35,971 | 2,150 | 17 |
| A | Nitrogen | 54,216 | 2,200 | 25 |

Comparing the results in Test 2, the number of packages printed per milliliter of vehicle increased by about 47% when the nitrogen was used as carrier gas instead of the compressed air.

What is claimed is:

1. A method for ink jet printing which reduces or eliminates nozzle clogging, comprising (A) feeding gas through a feed line which terminates with an opening;

(B) feeding into said feed line ink concentrate which contains at least one component whose particle size increases upon contact with water;

(C) feeding into said feed line a vehicle which forms ink when combined with said ink concentrate;

(D) combining said ink concentrate and said vehicle in said feed line to form ink; and (E) applying sufficient pressure to said feed line to expel said ink out said opening; wherein said gas and said vehicle contain no water or have a combined water content insufficient to cause said increase in particle size.

2. A method according to claim 1 wherein the gas and the vehicle contain no water.

3. A method according to claim 1 wherein the combined water content of the gas and the vehicle is not more than 0.0060 wt. %.

4. A method according to claim 1 wherein the gas is nitrogen.

5. A method according to claim 1 wherein the ink concentrate contains nitrocellulose.

6. A method according to claim 1 wherein a chamber is located in said feed line downstream of the points at which said vehicle and said ink concentrate are fed into said feed line, which chamber contains sensing means for sensing the viscosity of ink in the chamber and means for increasing the amount of vehicle fed into said chamber when said sensing means senses an increase in said viscosity.

7. Apparatus for ink jet printing which reduces or eliminates nozzle clogging, comprising (a) a gas source containing gas;

(b) an ink concentrate source which contains ink concentrate comprising at least one component which increases in particle size when contacted with water;

(c) a vehicle source containing vehicle which forms ink when combined with said concentrate;

(d) a feed line connected to said gas source and ending in an opening, wherein said gas can flow through said feed line from said gas source to said opening;

(e) lines connecting said ink concentrate source and said vehicle source to said feed line; and (f) means for controllably passing gas from said gas source through said feed line, combining said ink concentrate and said vehicle in said line to form ink, and expelling said ink out said opening, wherein said gas and said vehicle contain no water or together have a water content insufficient to cause said increase in particle size.

8. Apparatus according to claim 7 wherein the gas and the vehicle contain no water.

9. Apparatus according to claim 7 wherein the combined water of the gas and the vehicle is not more than 0.0060 wt. %.

10. Apparatus according to claim 7 wherein the gas is nitrogen.

11. Apparatus according to claim 7 wherein the ink concentrate contains nitrocellulose.

12. Apparatus according to claim 7 wherein a chamber is located in said feed line downstream of points at which said vehicle and said ink concentrate are fed into said feed line, which chamber contains sensing means for sensing the viscosity of ink in the chamber and means for increasing the amount of vehicle fed into said chamber when said sensing means senses an increase in said viscosity.

* * * * *